(12) United States Patent
Nishida et al.

(10) Patent No.: US 7,934,082 B2
(45) Date of Patent: Apr. 26, 2011

(54) INFORMATION PROCESSING APPARATUS AND EXCEPTION CONTROL CIRCUIT

(75) Inventors: Hideshi Nishida, Hyogo (JP); Takeshi Furuta, Kyoto (JP); Tetsuya Tanaka, Kyoto (JP); Kozo Kimura, Osaka (JP); Tokuzo Kiyohara, Osaka (JP)

(73) Assignee: Panasonic Corporation, Osaka (JP)

( * ) Notice: Subject to any disclaimer, the term of this patent is extended or adjusted under 35 U.S.C. 154(b) by 530 days.

(21) Appl. No.: 11/658,816

(22) PCT Filed: Aug. 19, 2005

(86) PCT No.: PCT/JP2005/015139
§ 371 (c)(1),
(2), (4) Date: Sep. 12, 2008

(87) PCT Pub. No.: WO2006/022202
PCT Pub. Date: Mar. 2, 2006

(65) Prior Publication Data
US 2009/0049219 A1    Feb. 19, 2009

(30) Foreign Application Priority Data
Aug. 27, 2004  (JP) ................................ 2004-248040

(51) Int. Cl.
*G06F 9/48* (2006.01)
(52) U.S. Cl. .......... 712/244; 712/34; 345/502; 345/503; 345/504
(58) Field of Classification Search .................... 712/34, 712/244; 345/501–522; 710/260–269
See application file for complete search history.

(56) References Cited

U.S. PATENT DOCUMENTS

| | | | | |
|---|---|---|---|---|
| 5,632,037 A * | 5/1997 | Maher et al. | ................ | 713/322 |
| 5,784,291 A * | 7/1998 | Chen et al. | ................ | 716/10 |
| 5,890,010 A | 3/1999 | Nishigami | | |
| 5,987,556 A | 11/1999 | Nakagawa et al. | | |
| 6,061,711 A | 5/2000 | Song et al. | | |
| 6,373,493 B1 * | 4/2002 | Rickard et al. | ................ | 345/542 |
| 6,907,521 B2 * | 6/2005 | Saw-Chu et al. | ................ | 713/1 |
| 7,016,998 B2 * | 3/2006 | Mukherjee | ................ | 710/260 |
| 2002/0056034 A1 | 5/2002 | Gearty et al. | | |
| 2008/0301687 A1* | 12/2008 | Gosalia et al. | ................ | 718/103 |

FOREIGN PATENT DOCUMENTS

| | | |
|---|---|---|
| JP | 07-219774 | 8/1995 |
| JP | 10-143481 | 5/1998 |
| JP | 10-340128 | 12/1998 |
| JP | 2876791 | 3/1999 |
| JP | 2001-142701 | 5/2001 |

* cited by examiner

*Primary Examiner* — William M Treat
(74) *Attorney, Agent, or Firm* — Wenderoth, Lind & Ponack, L.L.P.

(57) ABSTRACT

An information processing apparatus performs switching between an exception handler and normal processing. The information processing apparatus includes a processor a data processing unit that performs a particular processing upon receiving a processing request from the processor; an interrupt controller that issues an interrupt request to the processor; and an exception control unit that controls the interrupt controller, wherein the data processing unit is connected with the exception control unit via a dedicated line. The data processing unit includes a notification unit that notifies, via the dedicated line, the exception control unit of status information indicating current status of the data processing unit, and based on the notified status information and setup information set by the processor, the exception control unit judges whether to cause the interrupt controller to issue to the processor an interrupt request to execute an exception handler.

11 Claims, 5 Drawing Sheets

FIG.3

```
        Start:
1:          write BUSY, intreg;
2:          write CMD0, extreg;
3:          nop;
4:          nop;
5:          read extreg, reg0;
        Next:
6:          write CMD1, extreg;
7:          nop;
8:          nop;
9:          read extreg, reg1;
10:         end;

Busy:
11:         read epc, reg2;
12:         store reg2, men;
13:         write READY, intreg;
        Loop:
14:          goto Loop;
        Ready:
15:         write BUSY, intreg;
16:         load mem, reg3;
17:         return reg3;
                .
                .
                .
```

FIG.4

| CYCLE | INSTRUCTIONS DECODED BY PROCESSOR 3 | reg | STATUS OF ACCELERATOR 6 |
|---|---|---|---|
| 1 | 1: write BUSY, intreg; | NOTIFY | idle |
| 2 | 2: write CMD0, extreg; | idle | idle |
| 3 | 3: nop; | idle | busy(EXECUTE CMD0) |
| 4 | 4: nop; | busy | busy |
| 5 | 5: read extreg, reg0; | busy | busy |
| 6 | 11: read epc, reg2; INTERRUPT | busy | busy |
| 7 | 12: store reg2, mem; | busy | busy |
| 8 | 13: write READY, intreg; | busy | busy |
| 9 | 14: goto Loop; | busy | busy |
| 10 | 14: goto Loop; | busy | idle |
| 11 | 14: goto Loop;   INTERRUPT | idle | idle |
| 12 | 15: write BUSY, intreg; | idle | idle |
| 13 | 16: load mem, reg3; | idle | idle |
| 14 | 17: return reg3; | idle | idle |
| 15 | 5: read extreg, reg0; | idle | idle |
| 16 | 6: write LMD1, extreg; | idle | idle |
| 17 | 7: nop; | idle | busy(EXECUTE CMD1) |
| 18 | 8: nop; | busy | error |
| 19 | 9: read extreg, reg1; | error | error |
| ⋮ | 11: read epc, reg2;<br>⋮  INTERRUPT | error<br>⋮ | error<br>⋮ |

INFORMATION PROCESSING APPARATUS AND EXCEPTION CONTROL CIRCUIT

BACKGROUND OF THE INVENTION

1. Technical Field

The present invention relates to an information processing apparatus including therein a data processing unit that performs particular processing upon receiving a processing request from a processor, and especially relates to control of exceptions occurred in the data processing unit.

2. Background Art

Generally, an information processing apparatus such as a personal computer and a mobile apparatus includes therein a data processing unit, e.g. a graphics accelerator, a coprocessor, which performs predetermined processing requested by a built-in processor so as to reduce loads on the processor to increase processing efficiency thereof.

An exception might occur in processing performed by the data processing unit.

The exception indicates an abnormal situation out of a flow of a normal operation in the information processing apparatus, and includes the following situations for example: a situation where even if a processor requests the data processing unit to perform processing at a time when the data processing unit should be able to perform the processing in accordance with a program, the data processing unit cannot perform the processing; a situation where even if the processor tries to read a result of processing performed by the data processing unit at a time when the data processing unit should be able to read the result in accordance with the program, the result has not been output yet in the data processing unit; and a situation where an error occurs in the data processing unit.

In order to handle such an exception, the information processing apparatus generates an interrupt to the processor, and transfers control from a normal processing sequence to a predetermined starting address of an exception handler.

However, while the processor executes the exception handler due to the occurrence of the exception in the data processing unit, the normal processing sequence stops. Therefore, there is a demand for a technique for promptly performing switching between an exception handler and normal processing by early detecting an exception occurred in the data processing unit and a return from the exception, in order to increase processing efficiency of the processor.

SUMMARY OF THE INVENTION

In view of the above demand, an object of the present invention is to provide an information processing apparatus capable of performing switching between normal processing and an exception handler more promptly, an exception control circuit, and an exception control method.

In order to achieve the above object, the information processing apparatus according to the present invention is an information processing apparatus comprising: a processor; a data processing unit operable to perform particular processing upon receiving a processing request from the processor; an interrupt controller operable to issue an interrupt request to the processor; and an exception control unit operable to control the interrupt controller, wherein the data processing unit is connected with the exception control unit via a dedicated line, the data processing unit includes a notification unit operable to notify, via the dedicated line, the exception control unit of status information showing a current status of the data processing unit, and based on the notified status information and setup information set by the processor, the exception control unit judges whether to cause the interrupt controller to issue an interrupt request to execute an exception handler to the processor.

Also, the exception control circuit according to the present invention is an exception control circuit built in an information processing apparatus, the information processing apparatus comprising a processor, a data processing unit operable to perform particular processing upon receiving a processing request from the processor, and an interrupt controller operable to issue an interrupt request to the processor, wherein the exception control circuit is connected with the data processing unit via a dedicated line, the exception control circuit comprising: a first register operable to receive status information that shows a current status of the data processing unit via the dedicated line and store therein the status information; a second register operable to store therein setup information set by the processor; and a judgment unit operable to judge, based on the status information and the setup information, whether to cause the interrupt controller to issue an interrupt request to execute an exception handler to the processor.

Also, the exception control method according to the present invention is an exception control method used in an information processing apparatus, the information processing apparatus comprising a processor, a data processing unit operable to perform particular processing upon receiving a processing request from the processor, and an interrupt controller operable to issue an interrupt request to the processor, the exception control method comprising a judging step of judging, based on the notified status information and setup information set by the processor, whether to cause the interrupt controller to issue the interrupt request to execute an exception handler to the processor.

In the information processing apparatus having the above structure, the exception control unit is continuously notified of status information that shows a current status of the data processing unit via the dedicated line. Based on the notified status information and the setup information, the exception control unit judges whether to cause the interrupt controller to generate an interrupt. This enables the information processing apparatus to perform switching between normal processing and an exception handler more promptly to reduce the suspension of the normal processing.

Also, data processing units generally have a clock frequency slower than that of processors. Accordingly, the use of the information processing apparatus having the above structure can effectively reduce the suspension of the normal processing to be performed by the processor, which is caused by an exception occurred in the data processing unit.

Also, the effect described above can be achieved in the information processing apparatus that includes therein the exception control circuit having the above structure and the exception control method.

Here, when the processor executes one of an instruction to issue the processing request and an instruction to read a result of the processing, the exception control unit may perform the judgment within a cycle where the instruction is to be executed.

With this structure, at the same time when executing an instruction regarding the data processing unit, the exception control unit judges, within a cycle where the instruction is executed, whether to generate an interrupt for transferring control to a predetermined exception handler. This enables the information processing apparatus to perform switching between the normal processing and an exception handler more promptly to reduce the suspension of the normal processing.

Also, the status information may show one of a busy status where processing is performed and an idle status where processing is not performed, the setup information may be one of first information and second information, the first information showing a setup to judge whether to cause the interrupt controller to issue a first interrupt request to execute a first exception handler to the processor, and the second information showing a setup to judge whether to cause the interrupt controller to issue a second interrupt request to execute a second exception handler to the processor, the second exception handler may be processing for returning to a normal processing sequence performed by the processor, if the setup information is the first information and the status information shows the busy status, the exception control unit may cause the interrupt controller to issue the first interrupt request, if the setup information is the first information and the status information shows the idle status, the exception control unit may not cause the interrupt controller to issue the first interrupt request, and if the setup information is the second information and a status shown by the status information changes from the busy status to the idle status, the exception control unit may cause the interrupt controller to issue the second interrupt request. Also, the status information may show one of a busy status where processing is performed, an idle status where processing is not performed, and an error status where an error occurs, the setup information may be one of first information and second information, the first information showing a setup to judge whether to cause the interrupt controller to issue a first interrupt request to execute a first exception handler to the processor, and the second information showing a setup to judge whether to cause the interrupt controller to issue a second interrupt request to execute a second exception handler to the processor, the second exception handler may be processing for returning to a normal processing sequence performed by the processor, if the setup information is the first information and the status information shows the busy status or the error status, the exception control unit may cause the interrupt controller to issue the first interrupt request, if the setup information is the first information and the status information shows the idle status, the exception control unit may not cause the interrupt controller to issue the first interrupt request, and if the setup information is the second information and a status shown by the status information changes from the busy status or the error status to the idle status, the exception control unit may cause the interrupt controller to issue the second interrupt request.

With this structure, an exception handler to be executed by the processor is determined based on the setup information set by the processor. Also, in accordance with the notified status information (that shows a busy status, an error status, an idle status, etc.), switching between an exception handler and the normal processing can be promptly performed. Accordingly, the suspension of the normal processing can be reduced.

Also, the processor and the exception control unit may be formed on a same chip, and the data processing unit is formed on another chip.

The processor and the exception control unit are preferably formed on a single chip. On the other hand, even if the data processing unit is formed on a chip different from the single chip on which the processor and the exception control unit are formed, the information processing apparatus can perform switching between an exception handler and the normal processing more promptly to reduce the suspension of the normal processing.

Also, the information processing apparatus may further comprise a plurality of data processing units, wherein each of the data processing units may be connected with the exception control unit via a dedicated line, the exception control unit may perform the judgment based on pieces of setup information of the data processing units respectively set by the processor and pieces of status information respectively notified by the data processing units.

The information processing apparatus can include therein a plurality of data processing units. Even in this case, based on pieces of setup information and pieces of status information respectively notified via the dedicated lines, the exception control unit judges whether to cause the interrupt controller to generate an interrupt. This enables the information processing apparatus to performing switching between normal processing and an exception handler more promptly to reduce the suspension of the normal processing.

Also, the data processing unit may be an accelerator that performs routine processing.

The number of exceptions that occur in the data processing unit is limited. Accordingly, a program description of exception handlers that need to be prepared can be simplified, and the exception handlers can be easily implemented.

BRIEF DESCRIPTION OF THE DRAWINGS

FIG. 3 shows an example of a program executed by the information processing apparatus 1;

FIG. 4 shows an example of a specific flow of the program shown in FIG. 3; and

DESCRIPTION OF CHARACTERS

Figure 1:
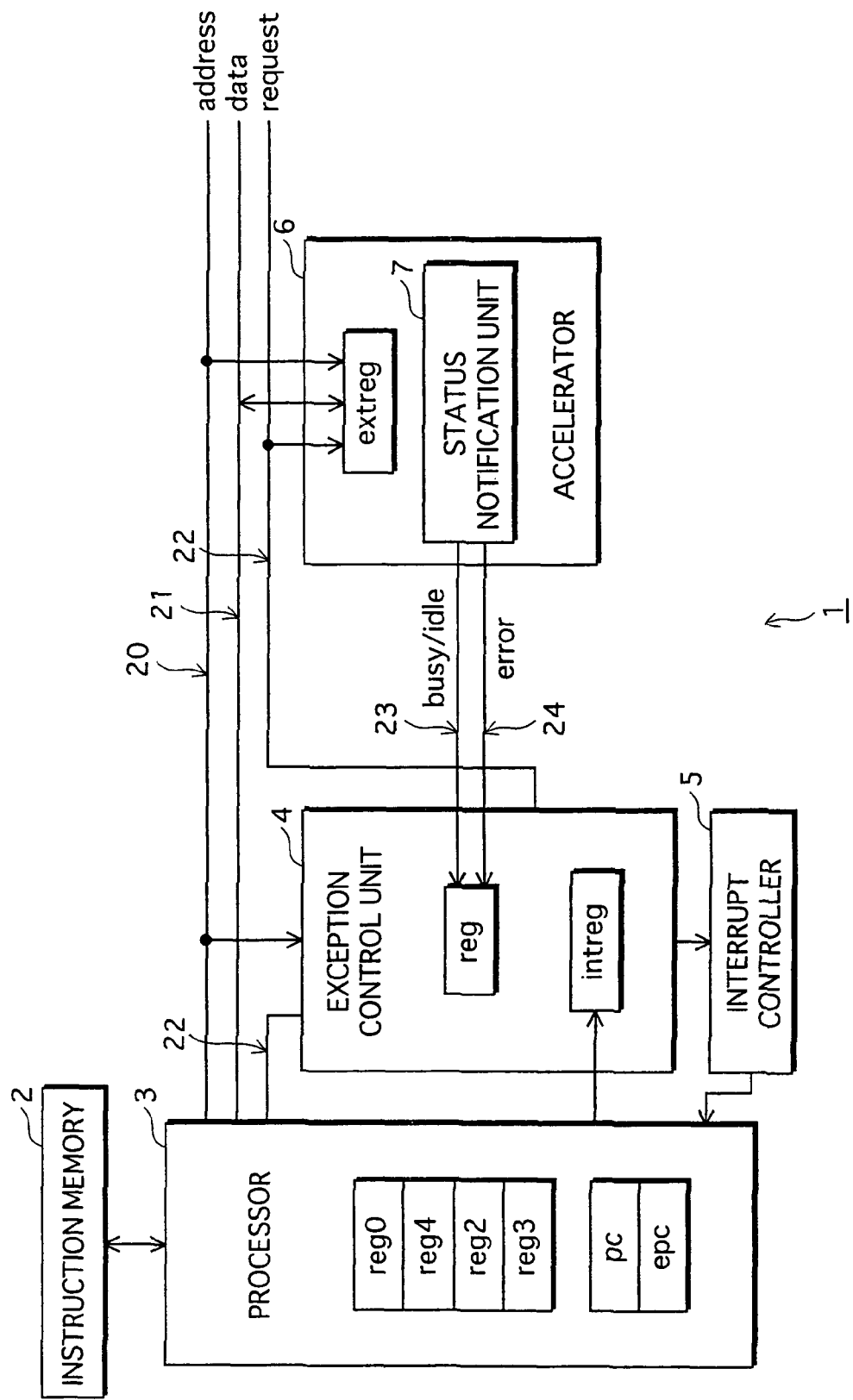
FIG. 1 shows a structure of an information processing apparatus 1.

1 and 1A: information processing apparatus
2: instruction memory
3: processor
4: exception control unit
5: interrupt controller
6: (first) accelerator
7 and 9: status notification unit
8: n-th accelerator
20: address bus
21: data bus
22: request bus
23: busy/idle signal line
24: error signal line

DETAILED DESCRIPTION OF THE INVENTION

The following describes an embodiment of the present invention, with reference to the drawings.

<Structure>

FIG. 1 shows a structure of an information processing apparatus 1.

The information processing apparatus 1 includes an instruction memory 2, a processor 3, an exception control unit 4, an interrupt controller 5, and an accelerator 6.

In the information processing apparatus 1, the processor 3 requests the accelerator 6 to perform processing by executing a program stored in the instruction memory 2.

The processor 3 is connected with the accelerator 6 via an address bus 20, a data bus 21, and a request bus 22. The request bus 22 connects the processor 3 and the accelerator 6 via the exception control unit 4.

The exception control unit 4 is connected with the accelerator 6 via a busy/idle signal line 23 and an error signal line 24 that are dedicated lines for transmitting status information.

The processor 3 and the exception control unit 4 are formed on a same chip, and the accelerator 6 is formed on another chip. Moreover, the processor 3 and the exception control unit 4 operate in a same clock cycle.

The processor 3 includes therein a reg0, a reg1, a reg2, and a reg3 that are general-purpose registers, a program counter (hereinafter "pc"), and an exception program counter (hereinafter "epc").

The pc is a register that stores a storage address of an instruction currently being executed. The epc is a register that stores a storage address of an instruction executed immediately before switching to an exception handler is performed.

The exception control unit 4 includes therein a reg and an intreg that are registers.

The accelerator 6 includes therein an extreg that is a register and a status notification unit 7 that notifies the exception control unit 4 of status information showing a current status of the accelerator 6.

The instruction memory 2 is a general memory that stores a program composed of a plurality of instructions.

The processor 3 is a general processor that reads an instruction from the instruction memory 2, and decodes and executes the read instruction.

If the instruction decoded by the processor 3 is a write instruction to write an instruction to request processing to the extreg of the accelerator 6 or a read instruction to read a result of the processing performed by the accelerator 6 written to the extreg, the processor 3 transmits an address of a writing location or a reading location to the accelerator 6 via the address bus 20, transmits data such as an operand to the accelerator 6 via a data bus 21, and transmits a command to the accelerator 6 via the request bus 22. Note that an instruction regarding the accelerator 6 is hereinafter referred to as simply the "accelerator instruction".

In addition, the program executed by the processor 3 has prewritten therein accelerator instructions so as to avoid issuing same accelerator instructions consecutively and set an exception vector address.

The exception vector address indicates a starting address of the exception handler.

Upon receiving an interrupt request with specification of a predetermined exception vector address from the interrupt controller 5, the processor 3 stops the normal processing sequence, and reads an instruction stored in the specified exception vector address, and then decodes and executes the read instruction.

The accelerator 6 is an accelerator for encoding MPEG (Motion Picture Expert Group)—compressed videos. When an instruction by the processor 3 for requesting processing is written to the extreg, the accelerator 6 performs video encoding processing.

There is a possibility that an exception such as an overflow of bit streams and a specific error occurs in the accelerator 6. Unless such an exception occurs, the accelerator 6 performs the requested processing in a time period corresponding to one cycle of the clock cycle of the processor 3 and the exception control unit 4, and writes a result of the processing to the extreg.

The status notification unit 7 notifies the exception control unit 4 of status information via the busy/idle signal line 23 and the error signal line 24.

Specifically, while the accelerator 6 is executing processing, the status notification unit 7 transmits a busy signal to the exception control unit 4 via the busy/idle signal line 23. While the accelerator 6 is not executing processing, the status notification unit 7 transmits an idle signal to the exception control unit 4 via the busy/idle signal line 23. Also, while an error occurs in the accelerator 6, the status notification unit 7 transmits an error signal to the exception control unit 4 via the error signal line 24.

Note that, while such an error occurs, the status notification unit 7 does not transmit a busy signal and an idle signal.

The status information notified from the status notification unit 7 is written to the reg of the exception control unit 4, and is updated.

Specifically, if the exception control unit 4 is notified of a busy signal, a value that shows "busy" is written to the reg. If the exception control unit 4 is notified of an idle signal, a value that shows "idle" is written to the reg. Also, if the exception control unit 4 is notified of an error signal, a value that shows "error" is written to the reg.

Based on the setup information written to the intreg and the status information written to the reg, the exception control unit 4 judges whether to cause the interrupt controller 5 to notify of one of a "BUSY" interrupt request and a "READY" interrupt request.

The "BUSY" interrupt indicates an interrupt for causing the processor 3 to stop the normal processing sequence and to start up an exception handler until recovering from an exception occurred in the accelerator 6. The "READY" interrupt indicates an interrupt for causing the processor 3 to start up an exception handler for performing processing to return to the normal processing sequence (hereinafter referred to as "exception return handler" in order to distinguish from the above exception handler regarding the "BUSY" interrupt).

In accordance with the instruction that is read from the instruction memory 2 and is executed by the processor 3, setup information that shows "BUSY" or "READY" is written to the intreg of the exception control unit 4.

"BUSY" indicates a setup to judge whether to cause the interrupt controller 5 to notify of the "BUSY" interrupt request. "READY" indicates a setup to judge whether to cause the interrupt controller 5 to notify of the "READY" interrupt request.

Upon execution of an accelerator instruction by the processor 3, the accelerator instruction is transmitted to the exception control unit 4 via the request bus 22. If the setup information written to the intreg shows "BUSY" and the status information written to the reg shows "busy" or "error", the exception control unit 4 judges to notify the interrupt controller 5 of an instruction to generate a "BUSY" interrupt.

On the contrary, if the setup information written to the intreg shows "BUSY" and the status information written to the reg shows "idle", the exception control unit 4 judges not to notify the interrupt controller 5 of the instruction to generate the "BUSY" interrupt.

Also, if the setup information written to the intreg shows "READY" and a status shown by the status information written to the reg changes from "busy" or "error" to "idle", the exception control unit 4 judges to notify the interrupt controller 5 of an instruction to generate a "READY" interrupt.

In accordance the instruction to generate the interrupt request notified by the exception control unit 4, the interrupt controller 5 generates the "BUSY" interrupt or the "READY" interrupt to the processor 3.

<Operations>

Next, operations of the information processing apparatus 1 are described.

Figure 2:
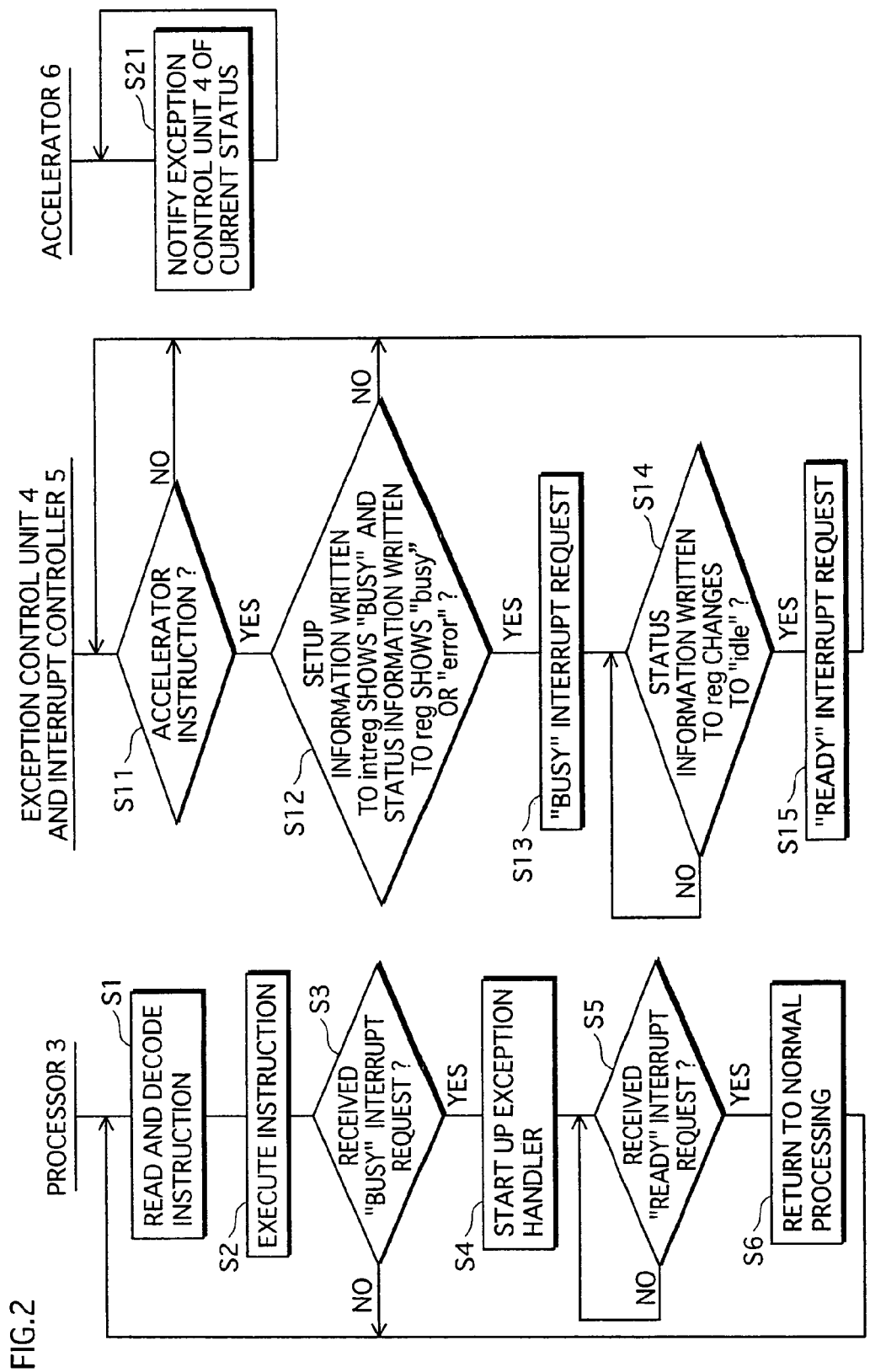
FIG. 2 is a flow chart showing interrupt control in the information processing apparatus 1.

FIG. 2 is a flow chart showing interrupt control in the information processing apparatus 1.

First, operations of the processor 3 are described.

The processor 3 reads an instruction from the instruction memory 2, decodes the instruction (Step S1), and executes the decoded instruction (Step S2).

If receiving a "BUSY" interrupt request from the interrupt controller 5 (Step S3: YES), the processor 3 starts up an exception handler based on a specified exception vector address (Step S4). If not receiving the "BUSY" interrupt request (Step S3: NO), the processor 3 reads and decodes an instruction in the normal processing.

If receiving a "READY" interrupt request while executing the exception handler (Step S5: YES), the processor 3 starts up an exception return handler based on a specified exception vector address (Step S6). If not receiving the "READY" interrupt request (Step S5: NO), the processor 3 continues executing the exception handler.

Next, operations of the exception control unit 4 and the interrupt controller 5 are described.

If the instruction decoded by the processor 3 is an accelerator instruction (Step S11: YES), the accelerator instruction is transmitted to the exception control unit 4 via the request bus 22. The exception control unit 4 checks what the setup information written to the intreg and what the status information written to the reg show.

If the setup information shows "BUSY" and the status information shows "busy" or "error" (Step S12: YES), the exception control unit 4 does not transmit the accelerator instruction to the accelerator 6, and causes the interrupt controller 5 to issue a "BUSY" interrupt request.

Based on the judgment, the interrupt controller 5 issues the "BUSY" interrupt request to the processor 3 (Step S13).

Then, if the exception control unit 4 detects, through a notification by the status notification unit 7, that a status shown by the status information written to the reg has changed because of an update from "idle" to "busy" (Step S14: YES), the exception control unit 4 causes the interrupt controller 5 to issue a "READY" interrupt request.

Based on the judgment, the interrupt controller 5 issues the "READY" interrupt request to the processor 3 (Step S15).

Finally operations of the accelerator 6 are described.

The accelerator 6 constantly notifies the exception control unit 4 of a current status of the accelerator 6 via the busy/idle signal line 23 and the error signal line 24 (Step S21).

Here, specific operations of the information processing apparatus 1 are described.

FIG. 3 shows an example of a program executed by the information processing apparatus 1. FIG. 4 shows a specific example of the flow of the program shown in FIG. 3.

In a cycle 1 shown in FIG. 4, the processor 3 decodes "write BUSY, intreg;" in a program line number 1 shown in FIG. 3, and writes "BUSY" to the intreg.

In a cycle 2, the processor 3 decodes "write CMD0, extreg;" in a program line number 2. This decoded instruction is an accelerator instruction, and therefore is transmitted to the exception control unit 4 via the request bus 22. The exception control unit 4 checks what the setup information written to the intreg and what the status information written to the reg show respectively. At this time, the setup information shows "BUSY", and the status information shows "idle". Therefore, the processor 3 continues performing the normal processing sequence.

Through a notification by the status notification unit 7, a status of the accelerator 6 in the previous cycle is written to the status information.

An instruction decoded by the processor 3 in a cycle 3 is "nop (no operation)", i.e., an instruction showing nothing to be operated. Therefore, the processor 3 executes nothing.

On the other hand, the accelerator 6 executes CMD0 written to the extreg in the cycle 3. Therefore, the status information shows "busy".

An instruction decoded by the processor 3 in a cycle 4 is "nop". Therefore, the processor 3 executes nothing.

On the other hand, an overflow of bit streams occurs in the accelerator 6 in the cycle 4. Therefore, the status information shows "busy".

As described above, the accelerator 6 basically performs processing in one cycle, writes a result of the processing to the extreg, and then promptly returns to an "idle" status. However, if an overflow of bit streams occurs, a "busy" status continues over several cycles.

In a cycle 5, the processor 3 decodes "read extreg, reg0;" in a program line number 5. This decoded instruction is an accelerator instruction, and therefore is transmitted to the exception control unit 4 via the request bus 22. The exception control unit 4 checks what the setup information written to the intreg and what the status information written to the reg show respectively.

At this time, the setup information shows "BUSY", and the status information shows "busy". Therefore, the exception control unit 4 does not transmit the accelerator instruction to the accelerator 6, and causes the interrupt controller 5 to issue a "BUSY" interrupt request.

In accordance with the judgment, the interrupt controller 5 issues, to the processor 3, a "BUSY" interrupt request with a specification of an exception vector address showing an instruction storage address in a program line number 11.

Upon receiving the request, the processor 3 decodes and executes "read epc, reg2;" in the program line number 11 in a cycle 6. That is, the processor 3 reads a value of epc (an instruction storage address in the program line number 5) to the reg2.

Subsequently, in a cycle 7, the processor 3 decodes and executes "store reg2, mem;" in a program line number 12. That is, the processor 3 stores a value of the reg2 in mem (showing the instruction memory 2).

Then, in a cycle 8, the processor 3 decodes and executes "write READY, intreg;" in a program line number 13. That is, the processor 3 writes "READY" to the intreg.

Then, in cycles 9 to 11, the processor 3 repeatedly executes "goto Loop;" in a program line number 14.

In the cycle 11, through a notification by the status information notification unit 7, the exception control unit 4 detects that a status shown by the status information in the reg has changed because of an update from "busy," to "idle", and causes the controller 5 to issue a "READY" interrupt request.

In accordance with the instruction by the exception control unit 4, the interrupt controller 5 issues, to the processor 3, the "READY" interrupt request with a specification of an exception vector address showing an instruction storage address in a program line number 15.

Upon receiving the request, the processor 3 decodes and executes "write-BUSY, intreg;" in the program line number 15 in a cycle 12. That is, the processor 3 writes "BUSY" to the intreg.

Subsequently, in a cycle 13, the processor 3 decodes and executes "load mem, reg3;" in a program line number 16. That is, the processor 3 loads a value of the epc stored in the mem (the instruction storage address in the program line number 5) to the reg3.

Then, in a cycle 14, the processor 3 decodes and executes "return reg3;" in a program line number 17. That is, the processor 3 returns the pc to the instruction storage address shown by the value loaded to the reg3.

In the cycle 15, the processor 3 decodes "read extreg, reg0;" in the program line number 5. This decoded instruction is an accelerator instruction, and therefore is transmitted to the exception control unit 4 via the request bus 22. The exception control unit 4 checks what the setup information written to the intreg and what the status information written to the reg show respectively.

At this time, the setup information shows "BUSY", and the status information shows "idle". Therefore, the processor 3 continues performing the normal processing sequence.

In a cycle 16, the processor 3 decodes "write CMD1, extreg;" in the program line number 6. This decoded instruction is an accelerator instruction, and therefore is transmitted to the exception control unit 4 via the request bus 22. The exception control unit 4 checks what the setup information written to the intreg and what the status information written to the reg show respectively.

At this time, the setup information shows "BUSY", and the status information shows "idle". Therefore, the processor 3 continues performing the normal processing sequence.

Instructions decoded by the processor 3 in cycles 17 and 18 are respectively "nop". Therefore, the processor 3 executes nothing.

On the other hand, in a cycle 19, the accelerator 6 executes CMD0 written to the extreg. Therefore, the status information shows "busy". In the cycle 18, an error specific to the accelerator 6 occurs. Therefore, the status information shows "error".

In the cycle 19, the processor 3 decodes "read extreg,reg1;" in a program line number 9. This decided instruction is an accelerator instruction, and therefore is transmitted to the exception control unit 4 via the request bus 22. The exception control unit 4 checks what the setup information written to the intreg and what the status information written to the reg show respectively.

At this time, the setup information shows "BUSY", and the status information shows "error". Accordingly, the exception control unit 4 does not transmit the accelerator instruction to the accelerator 6, and causes the interrupt controller 5 to issue a "BUSY" interrupt request.

In accordance with the instruction by the exception control unit 4, the interrupt controller 5 issues, to the processor 3, the "BUSY" interrupt request with a specification of an exception vector address showing an instruction storage address in the program line number 11.

Upon receiving the request, the processor 3 decodes and executes "read epc, reg2;" in a program line number 11 in the cycle 6.

The specific operations of the information processing apparatus 1 have been described. In the information processing apparatus 1 having the above structure, the exception control unit is continuously notified of status information that shows a current status of the accelerator 6 via the dedicated line. Based on the notified status information and the setup information, the exception control unit 4 judges whether to cause the interrupt controller 5 to generate an interrupt. This enables the information processing apparatus 1 to performing switching between the normal processing and an exception handler more promptly to reduce the suspension of the normal processing.

Modification Examples

The above-described information processing apparatus 1 includes therein only one accelerator. However, information processing apparatuses may include therein a plurality of accelerators.

Figure 5:
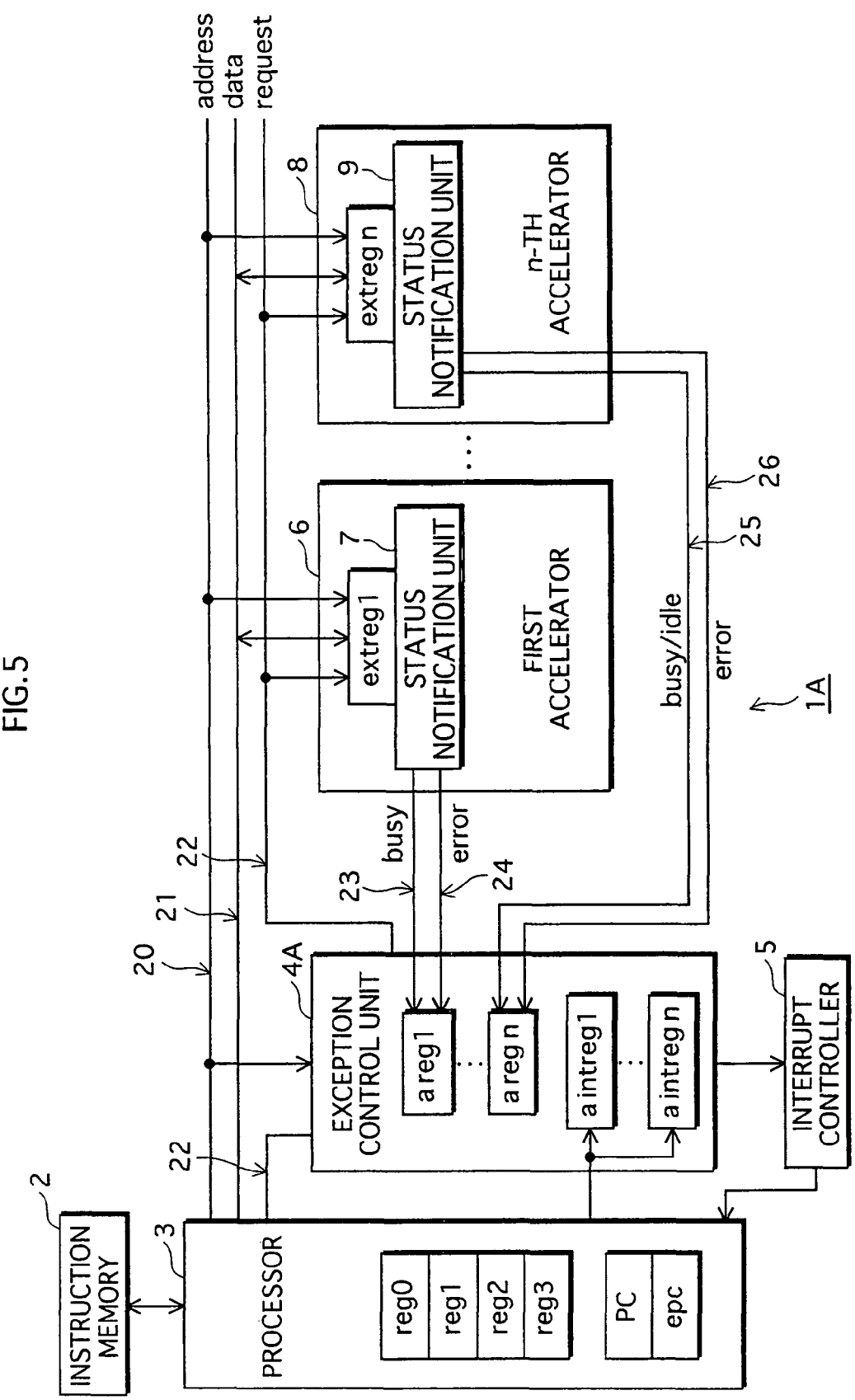
FIG. 5 shows a structure of an information processing apparatus 1A according to a modification example.

FIG. 5 shows a structure of an information processing apparatus 1A including therein n accelerators (where, n>2).

The information processing apparatus 1A differs from the information processing apparatus 1 in the following two points: the information processing apparatus 1A includes therein a plurality of accelerators; and an exception control unit 4A includes therein a plurality of registers for storing pieces of status information and pieces of setup information respectively corresponding to the plurality of accelerators.

A first accelerator 6 and an n-th accelerator 8 perform different processing respectively. Also, an exception that might occur in the first accelerator 6 is different from that in the n-th accelerator 8.

The first accelerator 6 is an accelerator for encoding MPEG-compressed videos. When an instruction that shows a processing request by the processor 3 is written to the extreg, the first accelerator 6 performs video encoding processing. There is a possibility that an exception such as an overflow of bit streams or a specific error might occur in the first accelerator 6.

The n-th accelerator 8 is an accelerator for decoding MPEG-compressed videos. When an instruction that shows a processing request by the processor 3 is written to the extreg, the n-th accelerator 8 performs video decoding processing. There is a possibility that an exception such as an overflow of bit streams or a specific error might occur in the n-th accelerator 8.

Also, in an (n−1)-th accelerator (not shown), a specific exception does not occur, and only an exception with no specification of addresses occurs.

Based on pieces of the setup information written to an aintregn and pieces of the status information written to an aregn respectively corresponding to the above plurality of accelerators, the exception control unit 4A judges whether to cause the interrupt controller 5 to issue one of a "BUSY" interrupt request and a "READY" interrupt request.

<Supplementary Description>

The present invention is not of course limited to the above-described embodiment, and includes the following.

(1) In the above embodiment, there has been described that the processor 3 and the accelerator 6 operate in the same clock cycle. However, a clock frequency may be different between the processor 3 and the accelerator 6. Generally, a clock frequency of accelerators is slower than that of processors.

(2) In the above embodiment, there has been described that the processor 3 and the exception control unit 4 are formed on the same chip, and the accelerator 6 is formed on another chip. However, the processor 3, the exception control unit 4, and the accelerator 6 may be formed on a single LSI (Large Scale Integration) chip. Moreover, if a circuit integration technology to replace the current semiconductor technology appears as a result of the development of or derivation from the semiconductor technology, such a circuit integration technology may be used to form the processor 3, the exception control unit 4, and the accelerator 6 on a single chip integrated using such technology.

(3) In the above embodiment, the exception control unit 4 has been described as a circuit different from the processor 3. However, the exception control unit 4 may be included as a functional unit in the processor 3.

(4) The accelerator 6 may be realized by a logical element that can program routine processing that needs to be performed.

The present invention is useful in information processing apparatuses such as mobile phones, digital televisions, recorders, and personal computers, including therein a data processing unit such as a hardware accelerator, which performs particular processing upon receiving a processing request.

The invention claimed is:

1. An information processing apparatus, comprising:
a processor;
at least one data processing unit operable to perform a particular processing upon receiving a processing request from the processor; and
a control unit operable to (i) when an instruction to read a result of the processing request is issued by the processor, judge whether to notify the processor of an interrupt request based on setup information and status information, and (ii) when judging affirmatively, operable to notify the processor of the interrupt request, the setup information being based on an instruction issued by the processor, and the status information changing in accordance with the processing request and indicating a current status of the data processing unit.

2. The information processing apparatus of claim 1, wherein
the data processing unit is connected with the control unit via a dedicated line.

3. The information processing apparatus of claim 1, wherein
the status information indicates one of a busy status where the data processing unit performs processing and an idle status where the data processing unit does not perform processing,
the setup information is one of a first information and a second information, and
if the setup information is the first information and the status information indicates the busy status, the control unit notifies the processor of a first interrupt request to execute a first exception handler, and
if the setup information is the first information and the status information indicates the idle status, the control unit does not notify the processor of the first interrupt request, and
if the setup information is the second information and a status indicated by the status information changes from the busy status to the idle status, the control unit notifies the processor of a second interrupt request to execute a second exception handler that is a processing performed for returning to a normal processing sequence of the processor.

4. The information processing apparatus of claim 1, wherein
the status information indicates one of a busy status where the data processing unit performs processing and an idle status where the data processing unit does not perform processing,
the setup information is one of a first information and a second information, and
if the setup information is the first information and the status information indicates the busy status or the error status, the control unit notifies the processor of a first interrupt request to execute a first exception handler, and
if the setup information is the first information and the status information indicates the idle status, the control unit does not notify the processor of the first interrupt request, and
if the setup information is the second information and a status indicated by the status information changes from the busy status or the error status to the idle status, the control unit notifies the processor of a second interrupt request to a second exception handler that is a processing performed for returning to a normal processing sequence of the processor.

5. The information processing apparatus of claim 1, wherein
the processor and the control unit are formed on a same chip, and the data processing unit is formed on another chip.

6. The information processing apparatus of claim 1, further comprising:
a plurality of data processing units, wherein
the control unit notifies the processor of the interrupt request based on pieces of setup information of the data processing units respectively set by the processor and pieces of status information respectively notified by the data processing units.

7. The information processing apparatus of claim 1, wherein
the data processing unit is an accelerator that performs routine processing.

8. An exception control circuit for use in an information processing apparatus, the information processing apparatus comprising a processor, and a data processing unit operable to perform a particular processing upon receiving a processing request from the processor, wherein
the exception control circuit comprises:
a unit operable to (i) when the processor issues an instruction to read a result of the processing request, judge whether to notify the processor of an interrupt request based on setup information and status information, and (ii) when judging affirmatively, operable to notify the processor of the interrupt request, the setup information being based on an instruction issued by the processor, and the status information changing in accordance with the processing request and indicating a current status of the data processing unit.

9. An exception control method used in an information processing apparatus, the information processing apparatus comprising a processor, a data processing unit operable to perform a particular processing upon receiving a processing request from the processor, and an exception control unit, the exception control method, comprising:
when the processor issues an instruction to read a result of the processing request, judging in the exception control unit, based on setup information and status information, whether to notify the processor of an interrupt request, and
when judging to notify the processor of the interrupt request, notifying the processor of the interrupt request using the processor exception control unit, the setup information being based on an instruction issued by the processor, and the status information changing in accordance with the processing request and indicating a current status of the data processing circuit that is received from the data processing circuit.

10. The information processing apparatus of claim 1, wherein
each of the data processing units is connected with the control unit via a dedicated line.

11. An exception control method used in an information processing apparatus, the information processing apparatus comprising a processor, a data processing circuit operable to perform a particular processing upon receiving a processing request from the processor, an interrupt controller operable to issue an interrupt request to the processor, and an exception control unit, the exception control method, comprising:

when the processor issues an instruction to read a result of the processing request, judging in the exception control unit, based on setup information and status information, whether to cause the interrupt controller to issue an interrupt request to the controller for executing an exception handler, and when judging to cause the interrupt controller to issue the interrupt request, causing the interrupt controller to issue the interrupt request to the processor using the exception control unit, the setup information being based on an instruction issued by the processor, and the status information changing in accordance with the processing request and indicating a current status of the data processing circuit that is received from the data processing circuit.

* * * * *